Aug. 18, 1964 P. A. BECKER 3,145,314
DYNAMOELECTRIC MACHINE WITH LIQUID-COOLED
EXCITATION SUPPLY MEANS
Filed June 27, 1961 2 Sheets-Sheet 1
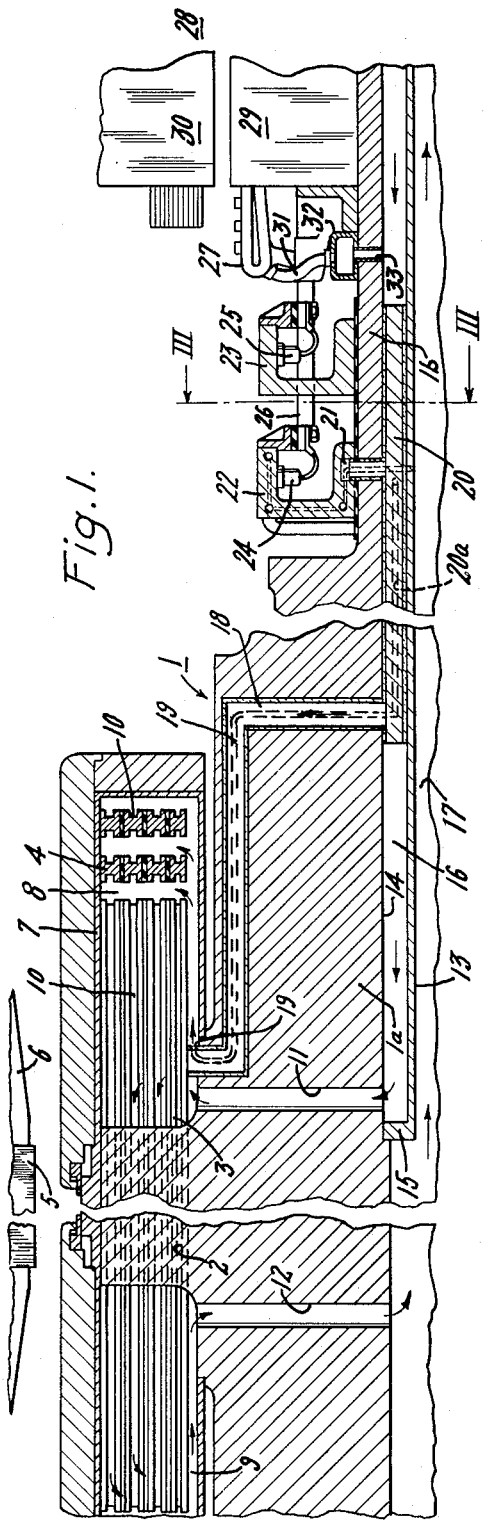
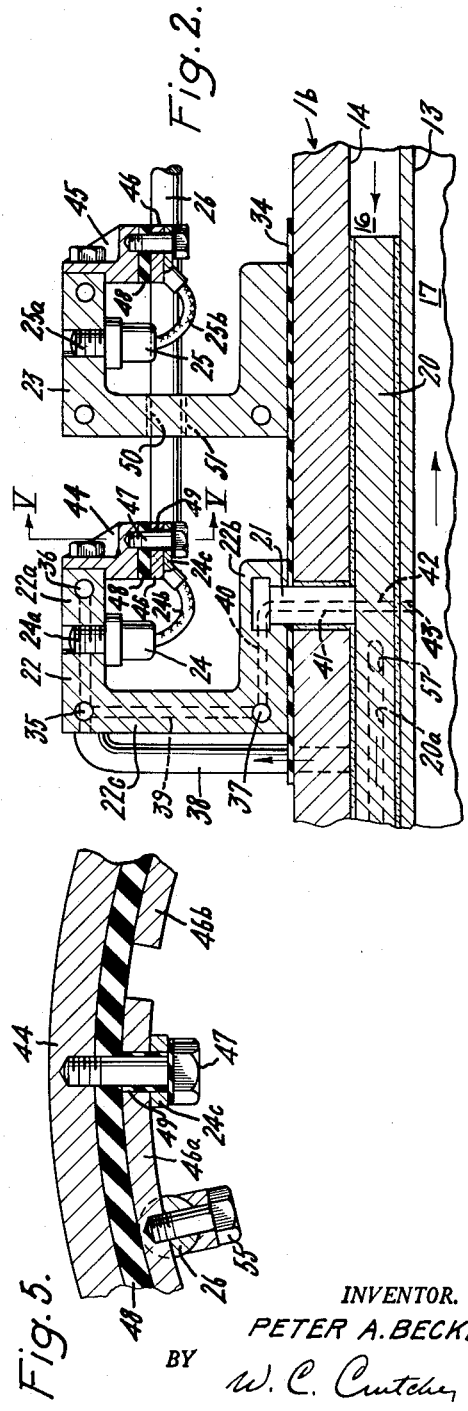
INVENTOR.
PETER A. BECKER
BY
W. C. Crutcher
HIS ATTORNEY INVENTOR.
PETER A. BECKER
BY W. C. Crutcher
HIS ATTORNEY

United States Patent Office 3,145,314
Patented Aug. 18, 1964

3,145,314
DYNAMOELECTRIC MACHINE WITH LIQUID-COOLED EXCITATION SUPPLY MEANS
Peter A. Becker, Frankfurt, Germany, assignor to General Electric Company, a corporation of New York
Filed June 27, 1961, Ser. No. 119,878
6 Claims. (Cl. 310—68)

This invention relates to a rotor for a dynamoelectric machine having a liquid-cooled winding thereon supplied by a brushless excitation system.

It has been suggested that higher capabilities can be obtained in large turbine-generators by cooling the rotor field windings with liquid, thereby allowing increased current densities in the rotor field windings. The subsequent requirements for higher field winding currents place a severe strain on the "conventional" field supply, which has used brushes and "collecting rings" in order to supply the excitation current from a stationary exciter to the rotating field windings. It has been suggested that brushes can be avoided by providing a rotating rectification system which, when supplied by a suitable excitation alternator, will provide the field current without the use of brushes.

Conventional excitation systems using brushes and collecting rings have been standardized in voltage ratings by manufacturers and there is insufficient flexibility in choosing a voltage tailored to a given field winding. With rotating rectifiers, any field voltage desired can be used, and each separate rating can have its own voltage level selected to make the winding design simple. Also the elimination of brushes allows higher currents at relatively low voltage which, in turn, permits the number of conductors per slot to be reduced, thereby reducing the number of hydraulic connecting joints in a liquid cooled rotor.

Since rectifiers in present use are temperature sensitive, i.e., the current rating is determined by the temperature, cooling means must be provided. It has been proposed to cool rotating rectifiers in small size alternators by disposing them in a hollow shaft filled with liquid, but this is not feasible in a large turbine-generator. It has also been proposed that shaft-mounted rectifiers can be cooled by a liquid circulating convectively under the influence of centrifugal force. However, a more desirable arrangement for insuring proper cooling, such as circulation under pressure so as to avoid formation of vapor pockets, would be desirable.

Accordingly, one object of the present invention is to provide an improved liquid-cooled dynamoelectric rotor having a liquid cooled brushless excitation system.

Another object of the invention is to provide an arrangement for cooling shaft-mounted rotating rectifiers which supply the field current for a geenrator rotor.

Still another object of the invention is to provide a rotating cooled rectifier mounting which allows great flexibility in the choice of the voltage and current for the field windings by allowing wide choice in the ratings and arrangement of the rectifiers.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a fragmental elevation drawing, in section, of portions of the upper half of a turbine-generator rotor.

FIG. 2 is an enlarged elevation, in section, of one form of rotating rectifier mounting arrangement.

FIG. 5 is a view of the exciter phase connection arrangement taken along lines V—V in FIG. 2.

Figure 3:
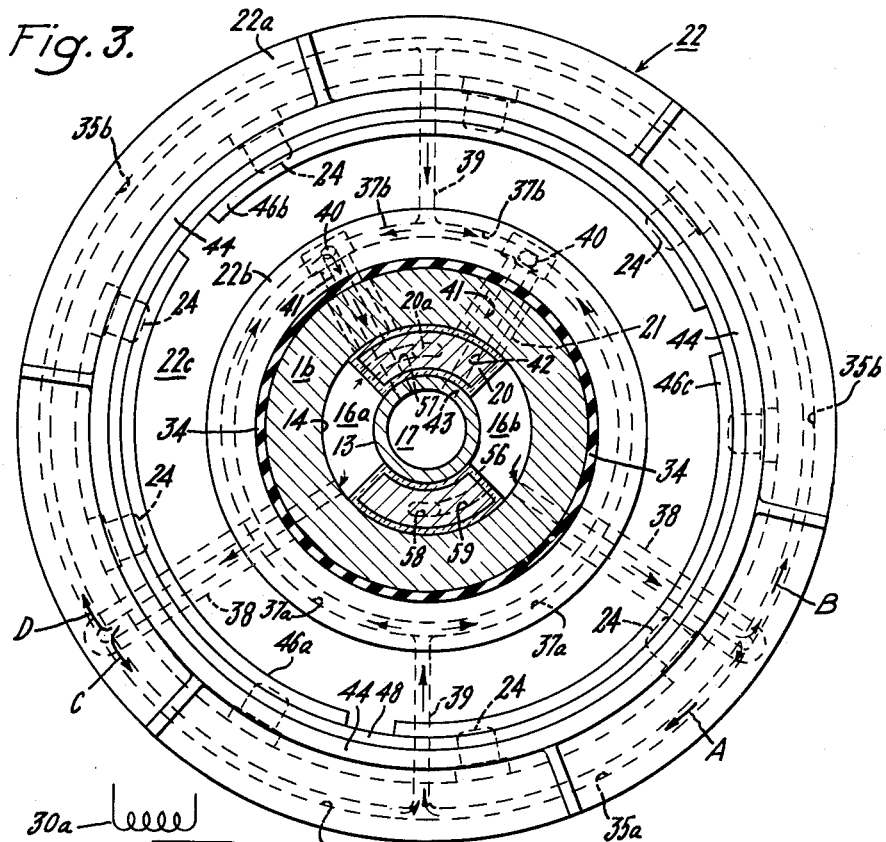
FIG. 3 is a still further enlarged transverse view of the rectifier mounting taken along lines III—III in FIG. 1.

Generally stated, the invention is practiced by providing special cooled "bus rings" disposed on the rotor shaft which also serve as "heat sinks" and centrifugal mounting structures for the rotating rectifiers. A liquid coolant is supplied to cool the exciter alternator windings, the bus rings, the lead-in conductors, and the generator field windings under a parallel flow, positive circulation arrangement.

*General Rotor Cooling Arrangement*

Referring now to FIG. 1 of the drawing, a segmental view of a generator rotor, designed generally as 1, comprises a body portion 1a and a spindle portion 1b. Due to the length of the rotor, it has been broken away at several portions so as to shorten the drawing, but it is understood by those skilled in the art that the body portion 1a usually includes a number of circumferentially spaced longitudinal slots 2, in which are disposed the field windings 3. Extending beyond slots 2 are the end turn portions 4 of the field windings. A portion of the stator is indicated as comprising a laminated magnetic core 5 in which are disposed armature windings 6. The liquid-cooled winding of rotor 1 may be either of the "flooded" or of the "individually piped" type. As shown here, the field winding 3 is of the "flooded" type and the entire winding 3, including end turns 4, is disposed in a cylindrical liquid-tight container 7 of any suitable type, defining an annular end-turn chamber 8, at one end of the rotor, and a similar annular end turn chamber 9, at the other end of the rotor. The windings 3, 4 define longitudinal grooves 10 along the conductors thereof so that the liquid entering chamber 8 can flow through slots 2 to chamber 9 at the other end of the rotor.

It is understood that in an "individually piped" rotor winding, suitable insulated pipes will carry the liquid to and from cooling ducts or conduits defined by the strands themselves. In the "flooded" design shown, however, the liquid simply enters chambers 8, flowing in through radial passage 11, and leaves chamber 9 at the other end of the rotor by flowing radially inward through passage 12. A pipe 13 located in the rotor bore hole 14 and held coaxial therewith by a sealing disk 15 serves to separate the bore hole into coaxial inlet and discharge longitudinal passages 16 and 17, respectively. These are fed from the end of the rotor shaft 1b by a suitable inlet and discharge manifold having rotating seals (not shown). It should be noted that the inlet passage 16 is at a greater radial distance from the rotor axis than passage 17. The normal circulation due to rotation which would take place with such an arrangement would be in the direction of the greater radial distance, i.e., due to the pressure of the liquid column between passages 17 and 16. However, the flow direction here is reversed and passage 16 is kept under a positive pressure greater than that produced by the rotation, so that a positive pressure exists on the liquid coolant at all times and there is little possibility of formation of vapor pockets, hence "hot spots."

The electrical supply to windings 3 comprises a lead-in conductor 18 defining an internal cooling conduit 19 discharging into chamber 8 through port 19. Conductor 18 is electrically connected to an axially extending conductor 20 located in bore hole 13. Conductor 20 defines a passage 20a over a portion of its length, which is connected to passage 19 in the lead-in conductor 18.

Turning now to FIG. 3 of the drawing, it may be seen that disposed in the bore hole 14 of spindle 1b outside of coaxial tube 13 are two axially extending conductors 20, 56 which are of circular segmental cross section. These, together with the tube 13, separate the bore hole into an axial discharge conduit 17, and axial inlet conduits, 16a, 16b. Longitudinal conduit 20a in axial conductor 20 communicates with axial inlet conduit 16a by means of a cross conduit 57. Similarly, the opposite segmental conductor 56 has a longitudinal conduit 58 which connects with axial inlet conduit 16b by a cross conduit 59.

*Rectifier Mounting Arrangement*

Disposed on the shaft spindle 1b (FIG. 1) are a pair of liquid-cooled rectifier-mounting annular "bus rings" 22, 23. Bus ring 22 is electrically connected by two radial studs, one of which is seen at 21, to the axially extending conductor 20, and bus ring 23 is connected by two similar radial studs (not shown) to a similar axially extending conductor (not shown). On bus rings 22, 23 are mounted a plurality of oppositely-poled solid-state rectifiers 24, 25 respectively.

Rectifiers 24, 25 are supplied, in turn, by means of axially extending phase leads 26 from the armature winding 27 of an exciter alternator. The exciter alternator, shown generally at 28, has a rotating armature 29 and a stationary field 30. The exciter armature windings 27 are internally cooled by liquid supplied through insulated pipes 31, furnished by an annular supply chamber 32 from radial passage 33 leading to bore hole passage 16. A similar discharge manifold (not shown) is located at the other end of armature 29 and is connected with bore hole passage 17.

Turning now to FIGURES 2 and 3 of the drawing, an enlarged view of the liquid-cooled rectifier-mounting bus rings 22, 23 may be seen. Only bus ring 22 will be described, it being understood that bus ring 23 is similarly cooled and connected to the other axially extending conductor 56. Bus ring 22 may be a ring of generally C-shaped cross section, separated from spindle 1b by a tube of insulation 34. Ring 22 comprises an outer circumferential flange 22a, an inner circumferential flange 22b, connected by a radial web 22c. Flange 22a defines circumferential cooling passages 35, 36 and flange 22b defines a circumferential cooling passage 37. Radial supply pipes 38 carry liquid from the bore hole to circumferential passages 35, 36 and radial passages 39 in web 22 carry liquid from circumferential passages 35, 36 to passage 37. From there passages 40 in flange 22b carry liquid axially to a radial passage 41 defined by stud 21. Passage 41 is aligned with passages 42, 43 in conductor 20, and separating tube 13 respectively. The cooling passages in bus ring 23 are similarly constructed, except that they are shifted on the shaft so that the proper electrical connections can be made.

Bus rings 22, 23 carry phase segment support rings 44, 45 respectively wihch serve to support arcuate phase segments 46. Phase segments 46 are secured to support rings 44, 45 by radially disposed bolts 47 and insulated therefrom by insulating rings 48 and bolt insulation 49. It should also be noted that where axial phase leads 26 pass through bus ring 23, they require holes 50, which are insulated with tubes 51.

The rectifiers 24, 25 are selected to be of opposite polarity for each ring, i.e., bus ring 22 might have rectifiers 24 designed to allow current flow toward the ring 22, and bus ring 23 would then utilize rectifiers allowing current to flow away from the ring 23. Hence bus rings 22, 23 would be the positive and negative buses respectively for supplying the field winding.

Rectifiers 24, 25 are desirably semi-conductor rectifiers or diodes, and preferably are silicon diodes. It should be noted that rectifiers 24, 25 are mounted in a radial direction with studs 24a, 25a disposed outward and the leads 24b, 25b connected to the arcuate phase segments 46. This represents an ideal mounting disposition for a rectifier which will be subjected to the centrifugal acceleration in a generator rotor which will be several thousand times that of gravity. Thus, this disposition is such as to compress the various elements of the rectifier to hold them intact rather than to tend to tear them apart.

FIG. 5 of the drawing, which is an enlarged section, shows the manner in which a number of rectifiers, such as 24, may be connected to each arcuate phase segment. As illustrated there, the lead 26 from the exciter alternator 28 is electrically connected to an arcuate segment 46a by a bolt 55. Angularly displaced from lead 26 can be seen the connecting clip 24c from the flexible lead of a rectifier (not shown), held in place by bolt 47 and insulated from support ring 44 by insulation 49. It will be appreciated that a large number of rectifiers 24 may be circumferentially displaced on the bus ring 22.

The end of another arcuate segment 46b of another phase may also be seen in the drawing. Normally, for a three-phase exciter alternator, there would be three such arcuate segments, such as 46a, 46b, etc. on each bus ring. The number of rectifiers connected in parallel to each phase segment 46 will depend upon the current to be carried by each rectifier.

Generally speaking, the manner of conducting liquid into and out of the bus ring 22 (see FIG. 3) is in two parallel flows from axial inlet conduits 16a, 16b. Each of these parallel flows is further subdivided to flow circumferentially in the outer flange of the ring, then radially in the web of the ring, then again circumferentially in the inner flange of the ring, then rejoining to flow radially to axial discharge conduit 17. This can be understood by following only one of the entering portions in FIG. 3, i.e., that entering from conduit 16b, and following it, first radially outward through pipe 38, and subdividing into branches "A" and "B," flowing circumferentially in the "shorter outer" path 35a and the "longer outer" path 35b respectively. Branch A flows radially inward through bottom conduit 39. Similarly, branch B flows radially inward through a similar diametrically opposite radial conduit 39 at the top of FIG. 3. Branch A now flows circumferentially along the "inner longer" path 37a while branch B flows along the "inner shorter" path 37b. The combined resistance to flow of the "outer shorter" path plus the "inner longer" path is preferably made equal to the combined resistance to flow of the "outer longer" path plus the "inner shorter" path in order that the flow in branches A and B will be equalized. Flows A and B recombine to flow radially inward through passages 41, 42, 43 to the central discharge conduit 17. Similar analysis can be made of branches C and D entering from bore hole conduit 16a.

The rectifiers 24 can be seen in dotted lines on FIG. 3 behind support ring 44. The leads connecting them to phase segments 46a, 46b, 46c are omitted for the sake of clarity, but it will be appreciated that three of the nine rectifiers are connected in parallel for each phase shown. However, any number of rectifiers can be so connected in parallel to each phase segment to limit the current carried by each rectifier simply by distributing more rectifiers circumferentially around the bus ring 22.

*Electrical Diagram*

Figure 4:
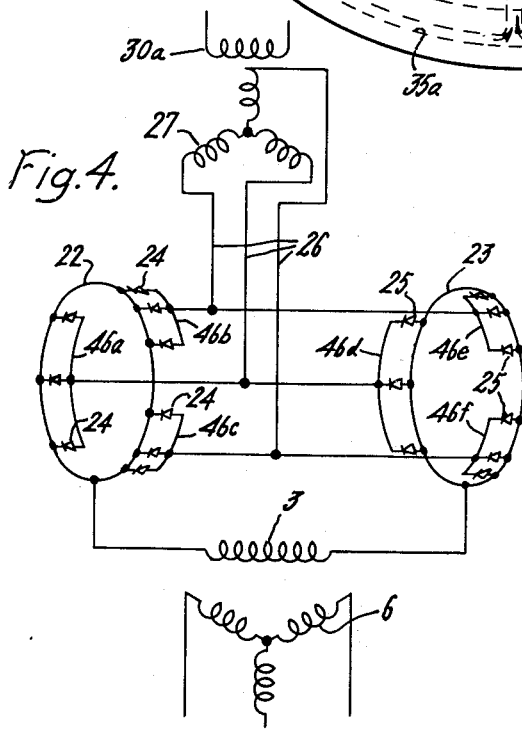
FIG. 4 is a schematic electrical diagram for the brushless excitation system.

A schematic view of the wiring is seen in FIG. 4. Bus rings 22, 23 each carry arcuate phase segments, shown as 46a–46c on ring 22, and as 46d–46f on ring 23. Each phase segment is supplied by a phase lead 26 from exciter armature winding 27 and supplies a number of rectifiers 24, 25 in parallel. The rectified excitation current flows between bus ring 22 and bus ring 23 through generator field winding 3. The exciter field windings 30a are used to control the voltage supplied to rectifiers 24, 25, and thus the magnitude of the D.C. current flowing to the main generator field winding 3. Thus the generator field windings 3 affect the output of the generator through armature windings 6. As mentioned previously, rectifiers 24, 25 are oppositely poled as shown schematically in FIG. 4.

Modified Rectifier Mounting Arrangement

Figure 6:
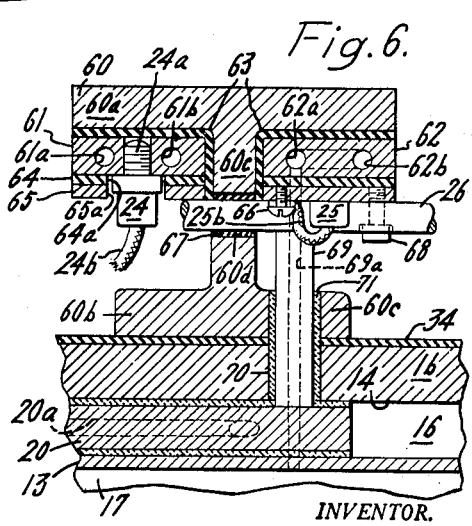
FIG. 6 is a modified rectifier mounting arrangement, partly in section.

A modified form of the invention may be seen in the cross-sectional view of FIG. 6 which is analogous to FIG. 2 of the drawings. Similar elements in FIGURES 2 and 6 carry the same reference numerals. In FIG. 6, however, both the positive and negative annular bus rings are carried by a single non-conducting load-bearing ring of I-shaped cross section. Ring 60 comprises an outer flange 60a, an inner flange 60b, and a connecting radial web 60c. Ring 60 is not a conductor, as were C-shaped rings 22, 23 in FIG. 2, since it is primarily a centrifugal load-restraining member.

The cooled annular bus rings are indicated at 61, 62 and are disposed on either side of web 60c on the underside of outer flange 60a. Each of bus rings 61, 62 defines internal circumferential cooling passages 61a, 61b, 62a, 62b respectively. Circumferentially spaced on the inside of rings 61, 62 are rectifiers 24, 25 respectively of opposite polarity. Bus rings 61, 62 are separated and insulated from flange 60a and web 60c by insulation 63. Radially inward from bus rings 61, 62 is a circumferential layer of insulating material 64. Radially inward from insulation 64 are the arcuate phase segments 65 which are comparable to phase segments 46 shown in FIG. 2.

Insulation 64 and phase segments 65 have circumferentially spaced holes 64a, 65a respectively to acommodate rectifiers 24, 25 which are attached to bus rings 61, 62 by threaded stud leads as indicated at 24a. The other leads 24b, 25b of rectifiers 24, 25 are attached to the arcuate phase segment 65 as indicated at 66. The phase leads 26 carrying excitation current from the exciter alternator pass through the web 60c of I-shaped ring 60 by means of circumferentially spaced holes 60d and are insulated from the ring 60 by insulating tubes 67. Phase leads 26 are connected to arcuate phase segments 65 on either side of the web 60c as indicated by screws 68.

In order to supply the rectified excitation current from bus rings 61, 62 to the field windings and also to convey cooling liquid, radial studs, one of which is seen at 69, connect the bus rings with the axial leads 20 disposed in the rotor shaft bore hole 14. Stud 69 passes through a slot 60c in the inner flange 60b, and through a hole 70 in the shaft spindle 1d. The stud is insulated from the ring and the shaft by an insulating tube 71.

Stud 69 also defines a radial cooling passage 69a which connects the circumferential cooling passages 62a, 62b in the bus ring 62 with the discharge passage 17 in the bore hole. Similar radial studs similar to stud 69 connect the bore hole supply passage 16 with circumferential cooling passages 62a, 62b; however, these are not shown since they are circumferentially displaced out of the plane of the drawing. The radial studs connected to bus ring 61 are also omitted for purposes of clarity, since they are similar to stud 69. It will be apparent that the radial studs may be arranged circumferentially to provide a continuous flow of liquid coolant from bore hole supply passage 16 to discharge passage 17.

Operation and Advantages

Turning back to the operation of the over-all rotor cooling arrangement as seen in FIG. 1, the flow of the liquid coolant is as follows. Cooling liquid entering bore hole passages 16 flows to the following places in parallel flow from the bore hole: to the exciter alternator winding cooling manifold 32; to each of the bus rings 22, 23; to the lead-in conductors 20, 18, and lastly through radial passage 11 to the field winding directly.

Discharge of the coolant to bore hole passage 17 is: from the field winding end turn chamber 9 through radial passage 12, from each of the bus rings 22, 23 through radial passages 41, and from the exciter alternator armature winding, all of these discharges to passage 17 also being in parallel. Since each discharge point is at a lesser radial location than the inlet point, and since all of the supply and discharges are in parallel, positive pressure on the liquid supply is required to maintain flow against the natural circulation created by rotation of the rotor. This insures a positive pressure throughout the system to discourage formation of vapor pockets.

With suitable modification, the rotor can also be of the individually piped rather than the flooded type, for example, by connecting insulated pipes in the vicinity of radial passage 11 to individual cooling passages in the winding.

The liquid-cooled rectifier-mounting bus rings, either of FIGURES 2, 3, 5 or of FIG. 6, are particularly useful in supplying a very simple means of converting the exciter alternating current to direct current and providing flexibility of voltage requirements. Both types of bus rings disclosed afford the following advantages. First, the fact that the rings have annular portions radially spaced from the shaft makes them ideal for mounting rectifiers in the proper position for subjection to the large centrifugal forces, i.e., with the studs extending radially against an outer support. Secondly, the positive liquid circulation through the passages in the annular portions of the bus rings causes them to be a good "heat sink" for carrying away heat generated by the temperature-sensitive rectifiers. Thirdly, the bus ring itself acts as a conducting electrical bus member for supplying the large currents necessary for excitation, and its own current carrying capability is increased by the cooling liquid. Fourth, great flexibility is afforded by simply adding additional rectifiers around the rings where current requirements are higher. Similarly, any number of phases for the excitation generator can be handled by changing the number of arcuate phase segments.

The C-shaped bus rings of FIGURES 2, 3, 5 may be preferable in some cases since the bus ring also acts as the load-bearing member to withstand centrifugal force on the rectifiers and hence is of simpler construction.

The bus rings of FIG. 6 supported by a separate I-shaped load-bearing ring may be preferred, on the other hand, where space saving is important, since they require less axial space on the rotor spindle.

Other modifications will occur to those skilled in the art, and it is of course desired to cover in the appended claims all such modifications as fall within the true spirit and scope of the invention.

What I claim as new and desire to secure by Letters Patent of the United States is:

1. In a generator of the type having an exciter alternator furnishing a regulated A.C. supply voltage from a rotating exciter armature, the combination of a rotor having a generator field winding thereon, a pair of electrically conductive insulated ring members mounted to turn with the rotor shaft, said ring members having annular portions radially spaced from the rotor shaft and defining gas-tight internal cooling passages, lead-in conductor means forming a series connection from one said ring member through said field winding to the other said ring member, means supplying liquid coolant to the field windings, the lead-in conductor means, and the ring member cooling passages, a plurality of rectifier means mounted on the radially inner side of said cooled annular portions of the ring members and electrically connected thereto, said rectifier means being furnished with a regulated A.C. supply voltage, whereby the ring members serve both to cool and support the rectifier means while also serving as electrical D.C. supply buses for the field windings.

2. In a generator of the type having an exciter alternator furnishing a regulated A.C. supply voltage from a rotating exciter armature, the combination of a rotor having spindle portions and a central body portion with a field winding thereon, a fluid-tight enclosure for said rotor field winding, a pair of insulated ring members mounted to turn with the rotor spindle and insulated therefrom, said ring members each having an electrically conductive annular portion coaxial with and radially spaced from the rotor spindle periphery, said ring members each including conduit means conducting cooling liquid in heat exchange relationship with said annular portion to cool it, insulated lead-in conductor means forming a series connection from one said ring annular portion through the field winding to the other said annular portion, means recirculating cooling liquid under pressure through said field winding enclosure and through said annular portion conduit means in parallel flow relationship, and a plurality of rectifier means mounted on the radially inner surface of said cooled annular portions and electrically connected thereto, part of said rectifier means being of one polarity and connected in parallel to one of said conductive annular portions and the remainder of said rectifier means being of opposite polarity and connected in parallel to the other of said conductive annular portions, whereby the ring members serve as a heat sink, a rectifier mounting structure, and positive and negative electrical supply buses for the field windings.

3. A combination rectifier mounting ring, electrical bus, and heat sink for a brushless generator excitation system comprising an electrically conductive ring member of substantially C-shaped cross section, including inner and outer circumferential flange portions and a connecting radial web portion, said ring member defining internal cooling passages, means recirculating cooling fluid through said passages, a plurality of circumferentially spaced rectifier means mounted on the inner surface of the outer circumferential flange and electrically connected thereto, a plurality of arcuate electrically conductive phase segments supported by and insulated from the ring member, said rectifier means also being connected to said phase segments in groups according to the number of phase segments.

4. In a generator of the type having an exciter alternator furnishing a regulated A.C. supply voltage from a rotating exciter armature, the combination of a rotor having a generator field winding thereon including conduit means in heat exchange relationship therewith, a pair of electrically conductive ring members mounted on the rotor shaft and insulated therefrom, each said ring member being of substantially C-shaped cross section including inner and outer circumferential flange portions and a connecting radial web portion, said ring members defining internal cooling passages, means recirculating cooling liquid through said field winding conduit means and through said ring member cooling passages in parallel flow relationship, lead-in conductor means forming a series connection from one said ring member through said field winding to the other said ring member, a plurality of circumferentially spaced rectifier means mounted on the inner surface of the outer circumferential flange of each ring member and electrically connected thereto, said rectifier means on one ring member being oppositely poled from those on the other ring member, a plurality of electrically conductive arcuate phase segments supported by and insulated from each ring member, said rectifier means being connected at their other terminals to said phase segments in groups according to the number of phase segments, and means furnishing a regulated A.C. excitation voltage to said phase segments.

5. A combination rectifier mounting, electrical bus, and heat sink for a brushless generator excitation system comprising a first load bearing ring of substantially I-shaped cross section, including inner and outer circumferential flange portions and a connecting radial web portion, second and third electrically conductive rings disposed on either side of said radial web portion radially inward of said outer flange portion of the load bearing ring and insulated therefrom, said second and third rings defining internal cooling passages, insulated conduit means connected to said second and third rings for recirculating cooling fluid through said cooling passages, a plurality of circumferentially spaced rectifier means mounted radially inward from the second and third rings, and electrically connected thereto, said rectifier means on the second ring being of opposite polarity from those on the third ring, a plurality of arcuate electrically conductive phase segments disposed radially inward from the second and third rings and insulated therefrom, said rectifier means also being electrically connected to said phase segments in groups according to the number of phase segments.

6. In a generator of the type having an exciter alternator furnishing a regulated A.C. supply voltage from a rotating exciter armature, the combination of a rotor having a generator field winding thereon including first cooling passage means in heat exchange relationship therewith, a first load-bearing ring of substantially I-shaped cross section mounted on the rotor shaft and insulated therefrom, said load-bearing ring including inner and outer circumferential flange portions and a connecting radial web portion, second and third electrically conductive rings mounted on either side of said radial web portion radially inward of said outer flange portion of the load-bearing ring and insulated therefrom, said second and third rings defining second and third internal cooling passage means respectively, means recirculating cooling liquid through all said cooling passage means in parallel flow relationship, lead-in conductor means forming a series connection from the second ring through said field winding to the third ring, a plurality of circumferentially spaced rectifier means mounted radially inward from the second and third ring members and electrically connected thereto, said rectifier means on the second ring being of opposite polarity from those on the third ring, a plurality of electrically conductive arcuate phase segments supported radially inward from the second and third ring members and insulated therefrom, said rectifier means also being electrically connected to said phase segments in groups according to the number of phase segments, and means furnishing a regulated A.C. excitation voltage to said phase segments.

References Cited in the file of this patent

UNITED STATES PATENTS

| | | |
|---|---|---|
| 2,722,652 | Brainard | Nov. 1, 1955 |
| 2,798,977 | Henter | July 9, 1957 |
| 2,832,907 | McConnell | Apr. 29, 1958 |
| 2,894,155 | Labastie | July 7, 1959 |
| 2,972,711 | Sorokin | Feb. 21, 1961 |